United States Patent [19]

Baum

[11] Patent Number: 5,338,024
[45] Date of Patent: Aug. 16, 1994

[54] GOLF CLUB

[75] Inventor: Charles S. Baum, Traverse City, Mich.

[73] Assignee: The Baum Research & Development Co., Inc., Traverse City, Mich.

[21] Appl. No.: 919,174

[22] Filed: Jul. 23, 1992

Related U.S. Application Data

[63] Continuation-in-part of Ser. No. 760,102, Sep. 16, 1991, abandoned, which is a continuation-in-part of Ser. No. 518,782, May 4, 1990, Pat. No. 5,114,144.

[51] Int. Cl.$^5$ ............................................. A63R 53/04
[52] U.S. Cl. ................................ 273/78; 273/167 H; 273/167 J
[58] Field of Search ............... 273/72 R, 77 R, 167 R, 273/78, 169, 172, 171, 173, 174, 175, 167 A, 167 C, 167 D, 167 E, 167 F, 167 H, 167 J, 167 K, 67 R

[56] References Cited

U.S. PATENT DOCUMENTS

| | | | |
|---|---|---|---|
| 4,076,254 | 2/1978 | Nygren | 273/173 |
| 4,204,684 | 5/1980 | Molitor | 273/167 R |
| 4,444,392 | 4/1984 | Duclos | 273/77 A |
| 4,449,707 | 5/1984 | Hayashi et al. | 273/171 |
| 4,451,041 | 5/1984 | Hayashi et al. | 273/167 H |
| 4,451,042 | 5/1984 | Hayashi et al. | 273/171 |
| 4,479,652 | 10/1984 | Nagamoto | 273/172 |
| 4,534,558 | 8/1985 | Yoneyama | 273/78 |
| 4,535,990 | 8/1985 | Yamada | 273/173 |
| 4,545,580 | 10/1985 | Tomita et al. | 273/167 R |
| 4,555,115 | 11/1985 | You | 273/167 R |
| 4,575,447 | 3/1986 | Hariguchi | 264/516 |
| 4,581,190 | 4/1986 | Nagamoto et al. | 264/136 |
| 4,624,460 | 11/1986 | Murase et al. | 273/167 H |
| 4,635,941 | 1/1987 | Yoneyama et al. | 273/78 |
| 4,648,598 | 3/1987 | Kim | 273/80 R |
| 4,676,508 | 6/1987 | Dilny | 273/186 D |
| 4,681,321 | 7/1987 | Chen et al. | 273/167 H |
| 4,689,257 | 8/1987 | Baum | 428/106 |
| 4,740,345 | 4/1988 | Nagasaki et al. | 264/257 |
| 4,754,975 | 7/1988 | Aizawa | 273/169 |
| 4,778,185 | 10/1988 | Kurokawa | 273/167 H |
| 4,792,139 | 12/1988 | Nagasaki et al. | 273/167 H |
| 4,793,616 | 12/1988 | Fernandez | 273/167 H |
| 4,798,383 | 1/1989 | Nagasaki et al. | 273/167 H |
| 4,812,187 | 3/1989 | Honma | 156/245 |
| 4,824,116 | 4/1989 | Nagamoto et al. | 273/171 |
| 4,848,745 | 7/1989 | Rohannan et al. | 273/72 R |
| 4,883,275 | 11/1989 | Boone | 273/172 |
| 4,928,972 | 5/1990 | Nakanishi et al. | 273/78 |
| 4,928,975 | 5/1990 | Skelley et al. | 273/192 |
| 4,951,953 | 8/1990 | Kim | 273/80 B |
| 4,964,640 | 10/1990 | Nakanishi et al. | 273/167 H |
| 4,984,800 | 1/1991 | Hamada | 273/173 |
| 5,000,454 | 3/1991 | Soda | 273/167 H |
| 5,004,242 | 4/1991 | Iwanaoa et al. | 273/169 |
| 5,009,425 | 4/1991 | Okumoto et al. | 273/167 R |
| 5,114,144 | 5/1992 | Baum | 273/72 R |

FOREIGN PATENT DOCUMENTS

| | | | |
|---|---|---|---|
| 0282115 | 9/1988 | European Pat. Off. | A63B 53/04 |
| 60-45542 | 10/1985 | Japan | A63B 53/04 |

*Primary Examiner*—Mark S. Graham
*Attorney, Agent, or Firm*—Krass & Young

[57] ABSTRACT

A golf club head is formed with a ball impacting face having an outer layer of wood veneer bonded to an inner layer of synthetic resin reinforced fibers by a synthetic resin which impregnates both layers. In a wood-type version of the club head, the outer shell is formed over a molded foam plastic core by covering the core with a flexible woven resin reinforced fibers sock, impregnating the sock with an uncured synthetic resin, covering the impregnated sock with a pair of shaped wood veneer matched halves so that the wood veneer is impregnated with resin, and curing the composite in forming molds.

6 Claims, 3 Drawing Sheets

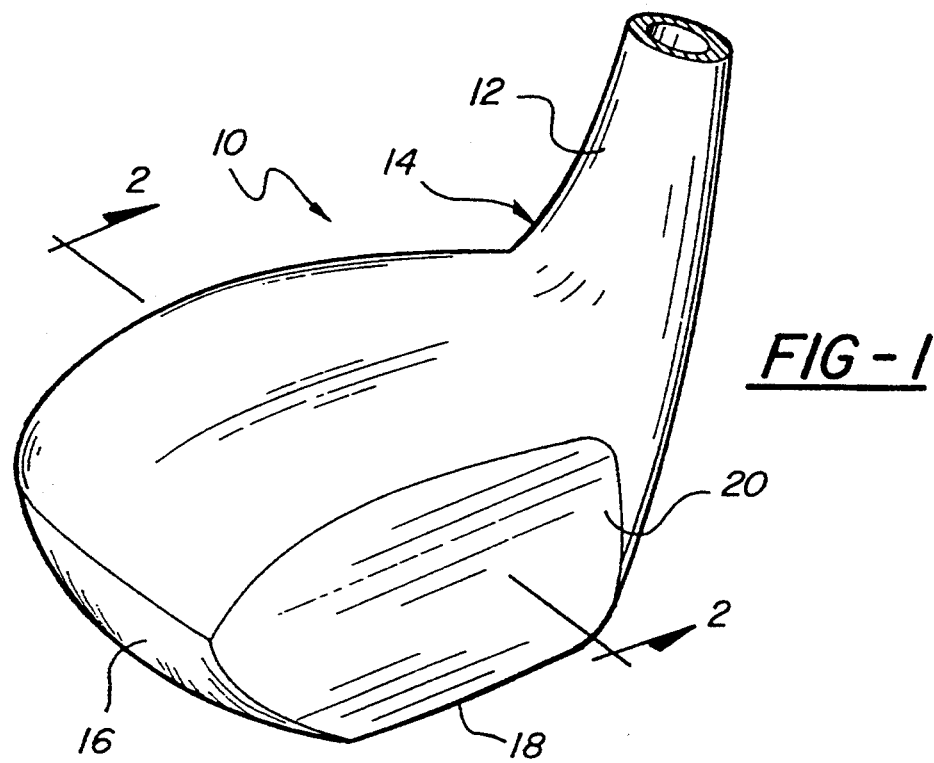
FIG-1
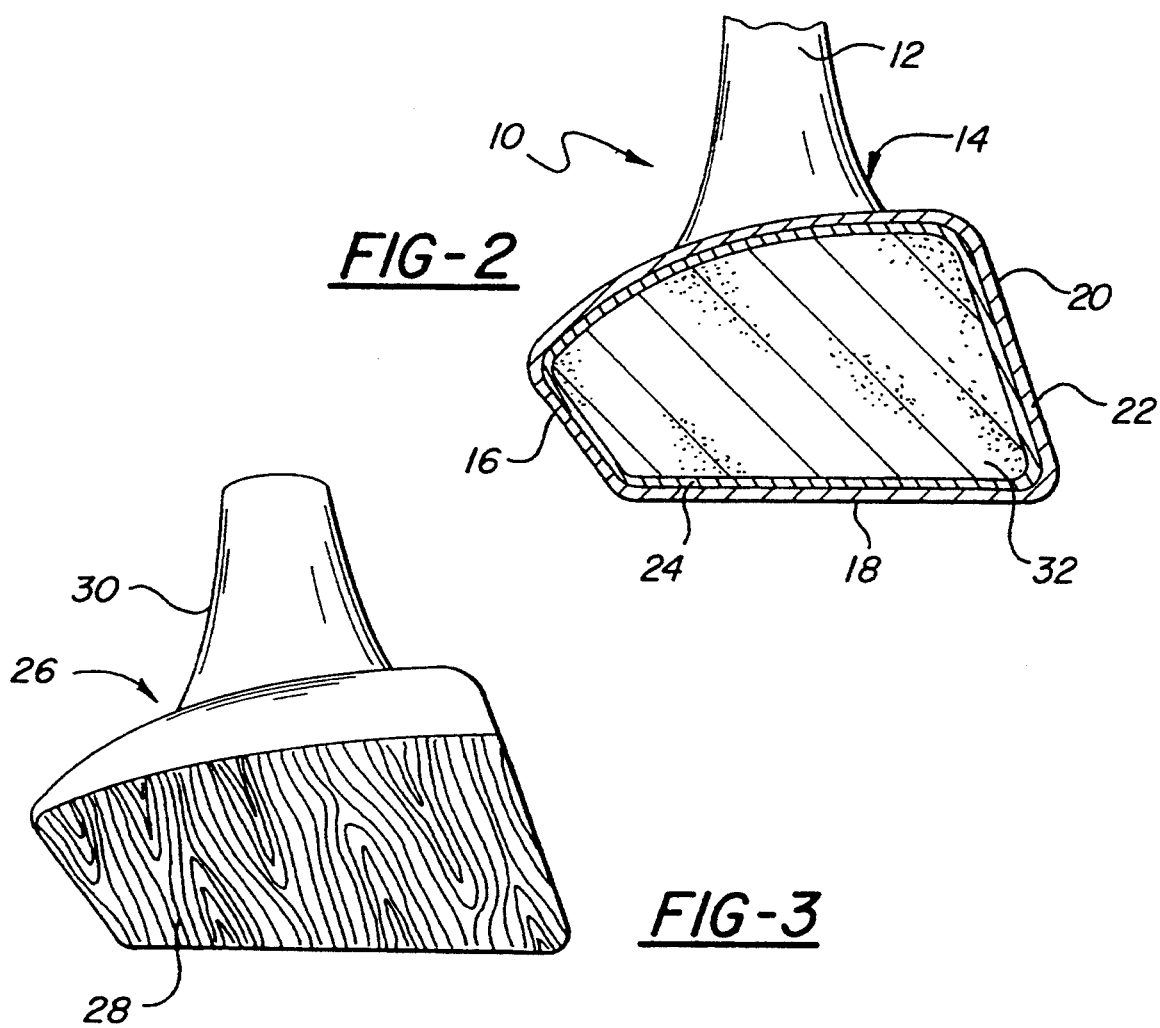
FIG-2
FIG-3

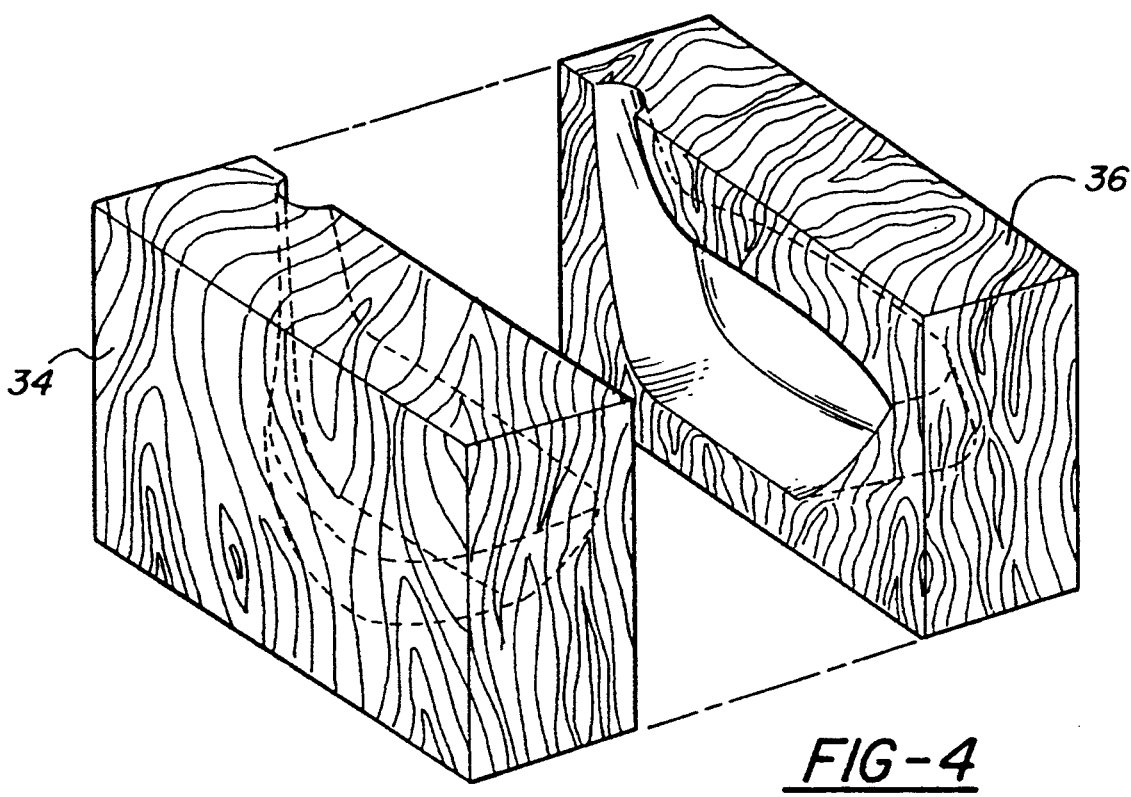
FIG-4
FIG-5
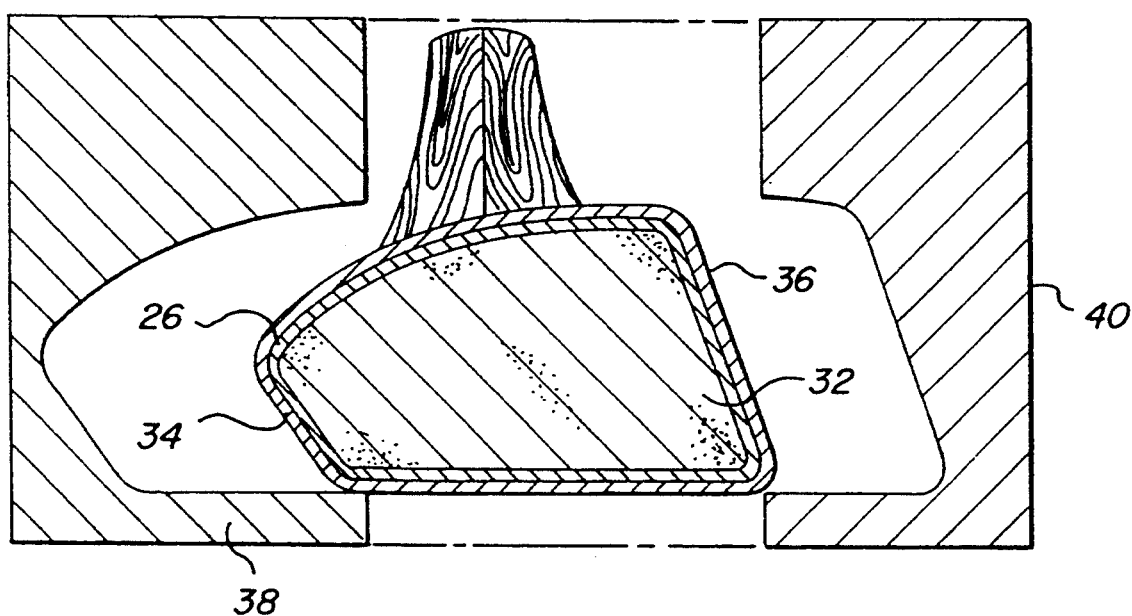

GOLF CLUB

REFERENCE TO RELATED PATENT APPLICATION

This application is a continuation-in-part of U.S. Ser. No. 760,102, filed Sep. 16, 1991, abandoned, which is a continuation-in-part of U.S. Ser. No. 518,782, filed May 4, 1990, now U.S. Pat. No. 5,114,144, issued May 19, 1992.

FIELD OF THE INVENTION

This invention relates to a golf club with a head having a hitting face formed of an outer layer of wood veneer and an inner layer of resin reinforced fibers, both layers having a general extension perpendicular to the direction of the club stroke with the two layers impregnated with and bonded together by cured synthetic resin, and to a method of making such club head.

BACKGROUND OF THE INVENTION

A variety of golf club heads have been proposed employing resin reinforced fiber plastic faces in order to create a high durability club capable of hitting golf balls a long distance. Use of a synthetic resin impregnated face lowers the weight of the golf club head relative to solid wood, allowing for a faster swing, and provides a high impact resistant surface. Typical U.S. patents disclosing such heads include U.S. Pat. Nos. 4,545,580; 4,575,447; 4,624,460; 4,798,383; and 4,824,116.

While the synthetic resin reinforced fibers used in these golf clubs have excellent strength characteristics in tension, they have substantially no compressive strength or impact resistance and they must be designed so as to avoid the possibility of the resin reinforced fibers breaking under the repeated heavy forces imposed when the club face impacts golf balls.

The physics of the impact between a golf club head and a golf ball are similar to those between a baseball bat and a baseball and my co-pending U.S. patent application Ser. No. 518,782 discloses a baseball bat having an outer layer of wood veneer and an inner layer of resin reinforced fibers. The synthetic resin impregnates both the layers and bonds them to one another. I have found the wood veneer and resin reinforced fiber layers act synergistically when bonded to one another with the wood fibers effectively distributing the forces created on impact with a ball over a substantial area of the underlying resin reinforced fibers to create a structure that is unusually impact resistant and locally deforms resiliently under impact to provide a relatively wide sweet spot so that the full power of the swinging club is transferred to the ball.

SUMMARY OF THE INVENTION

The present invention provides a golf club having a face formed of at least one outer layer of wood veneer and an inner layer of resin reinforced fibers, with both layers having a general extension perpendicular to the direction of the club stroke and the two layers both impregnated with and bonded together by the synthetic resin. The resulting hitting face is lightweight, highly resistant to damage under ball impacting forces and provides unusual ball impacting characteristics so that off-center hits transfer the club energy into the ball in an effective manner. The wood veneer outer surface of the club head is preferably visible by virtue of use of a transparent resin outer coating, providing the club head with the aesthetic appearance of a conventional wood head which golfers find attractive.

In a preferred embodiment of my invention taking the form of a wood-type golf club head, the composite wood veneer-resin reinforced fiber driving face is formed over a molded foam plastic core. The core shapes and supports the driving face and resiliently deforms when the face impacts the golf ball. Metal weights may be supported within the core to adjust the weighting of the head.

The preferred method of forming this golf club head involves molding the central core and then covering it with a sock of knitted or woven fibrous material. The sock is impregnated with a liquid synthetic resin. It is then covered by a sheath of wood veneer layers, preferably in the form of two pre-shaped matching wood veneer halves. The wood veneer is impregnated with a liquid resin and then the resin is set in female die halves or in vacuum bags.

Other objectives, advantages and applications of the present invention will be made apparent by the following detailed description of several preferred embodiments of the invention. The description makes references to the following drawings in which:

DETAILED DESCRIPTION OF THE DRAWINGS

FIG. 1 is a perspective view of a wood-type golf club head formed in accordance with the present invention;

FIG. 2 is a sectional view through the club head of FIG. 1 taken along line 2—2 of FIG. 1;

FIG. 3 is a perspective view of a knitted or woven fiber sock of the type used to form the golf club head of FIG. 1;

FIG. 4 is a perspective view of a pair of matched molds used to form the golf club head of FIG. 1;

FIG. 5 is a sectional view through the golf club head of FIG. 1 disposed within the shaping and curing female molds during the processing of the head;

DETAILED DESCRIPTION OF THE PREFERRED EMBODIMENT

Figure 6:
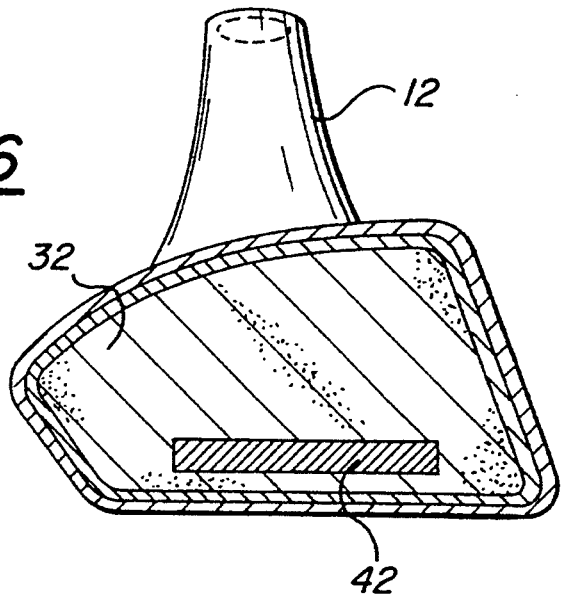
FIG. 6 is a sectional view through an alternative embodiment of a golf club head of the present invention employing a metal weight within the head.

The preferred embodiment of the invention illustrated in FIGS. 1 and 2 constitutes the head of a wood-type golf club, generally indicated at 10. The present invention could also be embodied in an iron-type club in accordance with the principles stated herein. The head includes a hollow hosel 12 adapted to receive a shaft (not shown). The hosel extends upwardly from a heel portion 14. The heel portion, along with a toe portion 16 and a connecting sole portion 18, generally define a rectangular structure having a driving face 20 as its forward surface. The face 20 is more planar than the curved surfaces 14, 16 and 18 but preferably exhibits a slight convexity in both the horizontal dimension, essentially parallel to the sole 18, and the vertical direction, transverse to the sole 18, so that the face surface has a slight bulge from heel to toe and a roll from the top to bottom edge. This non-planar configuration helps direct off-center hits in the intended direction of the shot.

The head 10, including the hosel 12 are defined by an outer layer 20 of hardwood veneer which may be formed by overlaying thinner layers. The veneer layer preferably has a thickness from 1/32 to 3/16 of an inch and is preferably formed of a hardwood such as oak, walnut, mahogany or white ash.

The wood veneer layer 22 overlies an inner layer 24 of synthetic fibers reinforced with plastic resin. The fibers are preferably knitted or woven into a sock generally indicated at 26 in FIG. 3 including a closed base portion 28 and an open throat 30 adapted to conform to the hosel 12. The fibers may be of any type conventionally used with reinforced plastics such as carbon, Kevlar or glass materials. Both the fiber layer 24 and the wood veneer layer 20 are fully impregnated with a synthetic resin such as epoxy. The layers are impregnated with unset epoxy and when the resin cures it bonds the layers to one another as well as forming a protective outer coating over the wood veneer surface 22. Epoxy may be used for the basic impregnation and a urethane outer coating may be formed on the outer surface to provide a transparent coating allowing the grain of the wood veneer to show through.

The fibrous layer 24 defined by the sock 26 is arrayed over and adhered by the resin to the outer surface of a core 32, preferably formed of a foamed plastic such as polyurethane. Alternatively, the core may be formed of other resilient materials such as balsa wood. The core 32 preferably is sufficiently resilient so as to deform in response to deformations of the club head face during impact with a golf ball. The core 32 preferably has an upward extension formed with a hollow socket in the area of the hosel. The core 32 is chosen to have a weight which will provide the golf club the same balance as a conventional wood-type club. The core may be also molded in such a manner as to create differing densities in different portions of the core to control the balance of the club. Alternatively, high density weights may be embedded within the core in the manner which will be described in connection with FIG. 6.

The preferred method of forming the golf club head 10 involves first molding core 32 into the desired configuration and density in a conventional manner. The sock 26 is knitted or woven so as to allow it to be pulled over the core 32. The outer surface of the core and the overlying sock 26 are then coated with resin in its liquid state.

Separately, a pair of matching wood veneer skin layers 34 and 36, as illustrated in FIG. 4, are prepared. The veneer sections 34 and 36 are cut and formed so that when joined over the sock covered core, they completely cover the surface, with their edges matching, although their edges need not match to achieve the goals of the invention. The sections are preferably formed in the manner disclosed in my co-pending patent application Ser. No. 518,782. This essentially involves cutting a pair of sections of veneer of the proper configuration, then impregnating them with water, alcohol, or another solvent so that they become relatively resilient and deformable. They are then placed within separate molds and pressed into the mold shape by air bags or other means. The hot air drives off the solvent so that the wood veneer sections dry to the shapes of their molds.

The premolded shapes 34 and 36 are then laid over the combination of the core 32, covered by the sock 26 and impregnated with the liquid resin. The skin sections 34 and 36 are also preferably impregnated with resin before being placed over the sock covered core.

This preassembled unit of the core 32, the overlying sock 26 and the veneer skin sections 34 and 36, with the outer surface thoroughly impregnated with uncured resin, is then pressed or vacuum bagged in matched metal molds 38 and 40 in the manner illustrated in FIG. 5. The molds are preferably designed so as to allow dissipation of any gasses released in the curing of the resin. When the resin is fully cured, the completed head is removed from the mold and a suitable shaft may be fitted within the hosel 12 to complete the club. Alternatively, the shaft may be disposed in the hosel during curing so that the resin bonds the shaft to the head.

FIG. 6 illustrates an alternative embodiment of the invention in which a metal weight 42 is embedded within the core 32, adjacent to the sole, so as to provide the head with desirable weighting. Other forms and combinations of weighting elements could be disposed within the core. Alternatively, various voids could be formed within the core to achieve desirable weighting.

The driving surface 20 thus constitutes a section of wood veneer, overlying a layer of resin reinforced fibrous fabric, with the two bonded together and impregnated with the resin. The layers of Veneer and resin reinforced fabric have a general extension perpendicular to the direction of the club stroke. The resin forms an outer protective coating for the wood veneer. The club's driving face is resiliently backed by the surface of the core 32, to which the outer layer are adhered by the resin, so as to allow deformation of the driving face upon impact with the golf ball. The driving face 20 undergoes a local deformation during impact with the ball, providing a desirable transfer of the kinetic energy of the swinging club head into the ball to produce drives of exceptional distance.

Figure 7:
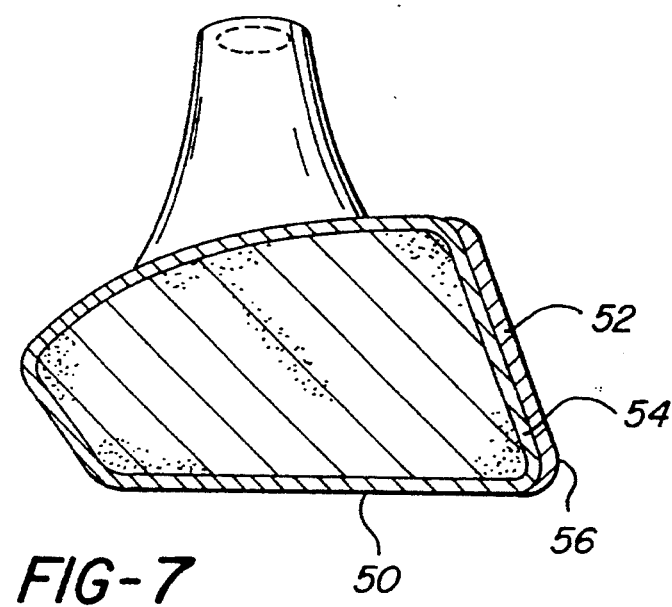
FIG. 7 is a sectional view through an alternative form of a wood-type golf club head made in accordance with the present invention wherein only the driving face is formed of the wood veneer-resin reinforced fiber composite.

FIG. 7 illustrates an alternative embodiment of a golf club head formed in accordance with my present invention.

The club has a body 50 defined by a resilient foamed plastic core 52. The entire surface of the core 52 is covered by a resin reinforced fiber system 54, preferably taking the form of a knitted or woven sock formed of glass, epoxy or Kevlar fibers impregnated with epoxy. The face area of the club, lying generally perpendicular to the direction of the club stroke, and the marginal edges of the face, are covered with a layer 56 of wood veneer impregnated with and bonded to the underlying layer by the resin. Appropriate metal weights (not shown) may be incorporated within the core 52 to achieve appropriate weighting of the club.

The face composite 54 and 56 acts much like a drum head, backed up by the resilient core 52, to impart the kinetic motion of the swinging club into a contacting golf ball.

Figure 8:
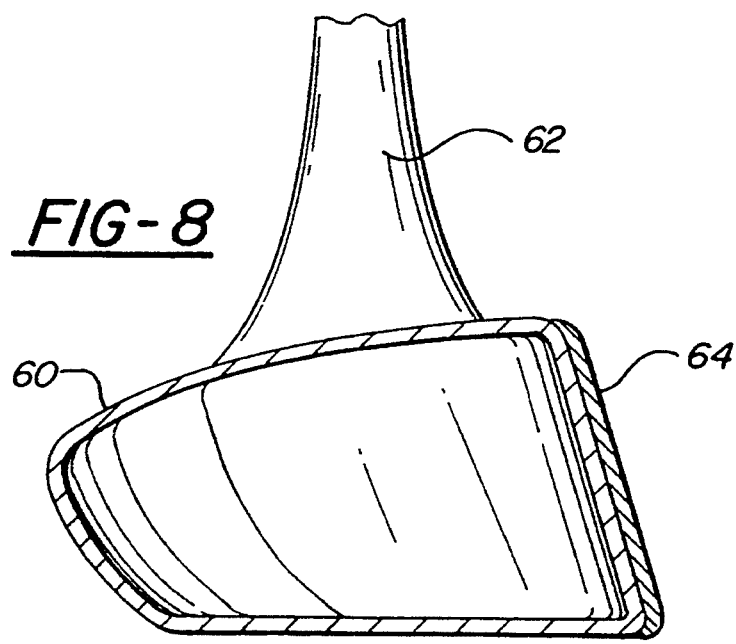
FIG. 8 is a sectional view through an alternative embodiment of my golf club with a hollow core taken through a plane analogous to the plane of FIG. 2.

An alternative embodiment of a golf club formed in accordance with the present invention, and having a hollow central core, is illustrated in FIG. 8. The outer contour of the club is formed by the fiber reinforced resin shell 60 leading into a hollow hosel 62 which may also be formed of a fiber reinforced resin or other material. The face of the club is covered by a sheet of wood veneer 64 impregnated with an epoxy resin and bonded to the face of the fiber reinforced resin section 60. The face composite resiliently deflects upon impact with the golf ball to impart the kinetic motion of the swinging club into the ball.

The structure of FIG. 8 may be formed by using an inflatable mold, which is deflated after the resin is set and removed through a hole leading into the hosel 62. Alternatively, the club may be formed in two sections meeting in a vertical plane parallel to the face of the club. The two sections may be joined by slip fitting one within the other and joining them with an adhesive.

Having thus described my invention I claim:

1. The method of forming a wood-type golf club head comprising:

forming a core;

placing a flexible resin reinforced fibrous sock over the core;

impregnating the flexible resin reinforced fibrous sock with synthetic resin;

covering at least part of the resin impregnated sock with wood veneer;

impregnating the wood veneer with synthetic resin; and curing the resin so as to bond the wood veneer over the resin reinforced fibrous sock and to the core.

2. The method of claim 1 in which the core is formed of molded plastic.

3. The method of claim 1 in which the curing of the resin is achieved within fitted female molds.

4. The method of claim 1 wherein said curing of the resin is achieved by pressuring the outer surface of the veneer with vacuum bags or air bags.

5. The method of claim 1 wherein the wood veneer is formed of two shells.

6. The method of claim 5 wherein the wood veneer shells are formed by shaping and drying solvent impregnated wood veneer layers in shaping molds.

* * * * *